(12) United States Patent
Oyamada et al.

(10) Patent No.: US 8,870,559 B2
(45) Date of Patent: Oct. 28, 2014

(54) MELT SPINNING APPARATUS AND MELT SPINNING METHOD

(75) Inventors: Mai Oyamada, Kariya (JP); Hiroshi Koyama, Tajimi (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 170 days.

(21) Appl. No.: 13/305,003

(22) Filed: Nov. 28, 2011

(65) Prior Publication Data

US 2012/0139153 A1  Jun. 7, 2012

(30) Foreign Application Priority Data

Dec. 1, 2010 (JP) ................................. 2010-268219

(51) Int. Cl.
*D01D 5/098* (2006.01)
*D01D 4/02* (2006.01)

(52) U.S. Cl.
CPC .............. *D01D 4/025* (2013.01); *D01D 5/0985* (2013.01)
USPC ...... 425/66; 264/555; 264/210.8; 264/211.14; 425/72.2

(58) Field of Classification Search
USPC ........ 425/7, 66, 72.2; 264/555, 210.8, 211.14
See application file for complete search history.

(56) References Cited

U.S. PATENT DOCUMENTS 3,920,362 A * 11/1975 Bradt ............................ 425/72.2
4,891,249 A * 1/1990 McIntyre .................... 427/208.6
4,988,560 A    1/1991 Meyer et al.
5,141,699 A    8/1992 Meyer et al.
5,160,746 A * 11/1992 Dodge et al. ....................... 425/7
5,993,943 A   11/1999 Bodaghi et al.
6,495,078 B1 * 12/2002 Kurihara et al. ................ 264/70
2011/0285053 A1  11/2011 Koyama et al.
2011/0285065 A1  11/2011 Koyama

FOREIGN PATENT DOCUMENTS

JP   01-201564   8/1989
JP   11-247062   9/1999
JP   2001-98455  4/2001

OTHER PUBLICATIONS

Japanese Office Action dated May 7, 2014, in corresponding Japanese Application 2010-268219.

* cited by examiner

*Primary Examiner* — Yogendra Gupta
*Assistant Examiner* — Joseph Leyson
(74) *Attorney, Agent, or Firm* — Greenblum & Bernstein, P.L.C.

(57) ABSTRACT

A melt spinning apparatus has an apparatus body, and the apparatus body includes a spinning nozzle through which a molten resin is extruded into a filament, a primary air channel for directing primary airflow to the filament of the molten resin extruded from the spinning nozzle, and a secondary air channel for directing secondary airflow to the filament at a position downstream of the primary air channel. A part, which is closer to the spinning nozzle, of a wall of the secondary air channel that defines an air exit of the secondary air channel is chamfered to straighten the secondary airflow.

5 Claims, 3 Drawing Sheets

US 8,870,559 B2

MELT SPINNING APPARATUS AND MELT SPINNING METHOD

BACKGROUND OF THE INVENTION

The present invention relates to a melt spinning apparatus for producing nonwoven fabrics using a melt blowing technique and a melt spinning method by using the apparatus.

Melt blowing is a kind of a melt spinning method that involves extrusion of a molten feedstock resin into fibers to produce a nonwoven fabric. More specifically, a molten resin is extruded through a nozzle while receiving hot and high speed airflow directed toward the resin. This produces uncured resin filaments (threads). The filaments are fed onto a conveyor belt to form a sheet of a nonwoven fabric on the conveyor belt.

As a melt spinning apparatus for producing nonwoven fabrics using the melt blowing technique, an apparatus for producing transversely aligned webs is known as described in, for example, Japanese Laid-Open Patent Publication No. 2001-98455. The apparatus described in this document comprises a spinning nozzle for extruding a molten resin into a filament, an annular nozzle formed around the spinning nozzle to direct hot primary airflow to the filament extruded from the spinning nozzle, thereby applying vibration to the filament to stretch it, and a secondary airflow nozzle for directing hot secondary airflow to the filament at a position downstream from the annular nozzle.

The primary airflow flows downward while taking in the surrounding air, so it often experiences a drop in temperature. Thus, the primary airflow may cool the filament extruded from the spinning nozzle, which may be a cause of preventing the filament from being thinner. Taking this into consideration, the apparatus disclosed in Japanese Laid-Open Patent Publication No. 2001-98455 is intended to keep the high temperature of the filament with the secondary airflow directed to the filament after the primary airflow.

However, the apparatus disclosed in this document has the wall defining the secondary airflow nozzle at approximately right angles to the secondary airflow nozzle. Accordingly, the secondary airflow leaving the secondary airflow nozzle tends to experience an eddy turbulence. The eddy turbulence causes the filament to progress along a wavy path rather than a straight path. This makes it difficult to provide sufficiently thin filaments.

SUMMARY OF THE INVENTION

Accordingly, an objective of the present invention is to provide a melt spinning apparatus and a melt spinning method with which thinner filaments can be obtained.

To achieve the foregoing objective and in accordance with a first aspect of the present invention, a melt spinning apparatus having an apparatus body is provided. The apparatus body includes a spinning nozzle, a primary air channel, and a secondary air channel. Through the spinning nozzle, a molten resin is extruded into a filament. The primary air channel directs primary airflow to the filament of the molten resin extruded from the spinning nozzle. The secondary air channel directs secondary airflow to the filament at a position downstream of the primary air channel. A part, which is closer to the spinning nozzle, of a wall of the secondary air channel that defines an air exit of the secondary air channel is chamfered to straighten the secondary airflow.

In accordance with a second aspect of the present invention, a melt spinning method in which the melt spinning apparatus according to the above first aspect is used. The method includes: extruding a molten resin into a filament through the spinning nozzle; and stretching the filament of the molten resin by using primary airflow and secondary airflow directed from the primary and secondary air channels, respectively, to the filament.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

First Embodiment

A first embodiment of the present invention will now be described with reference to FIGS. 1 to 3.

Figure 1:
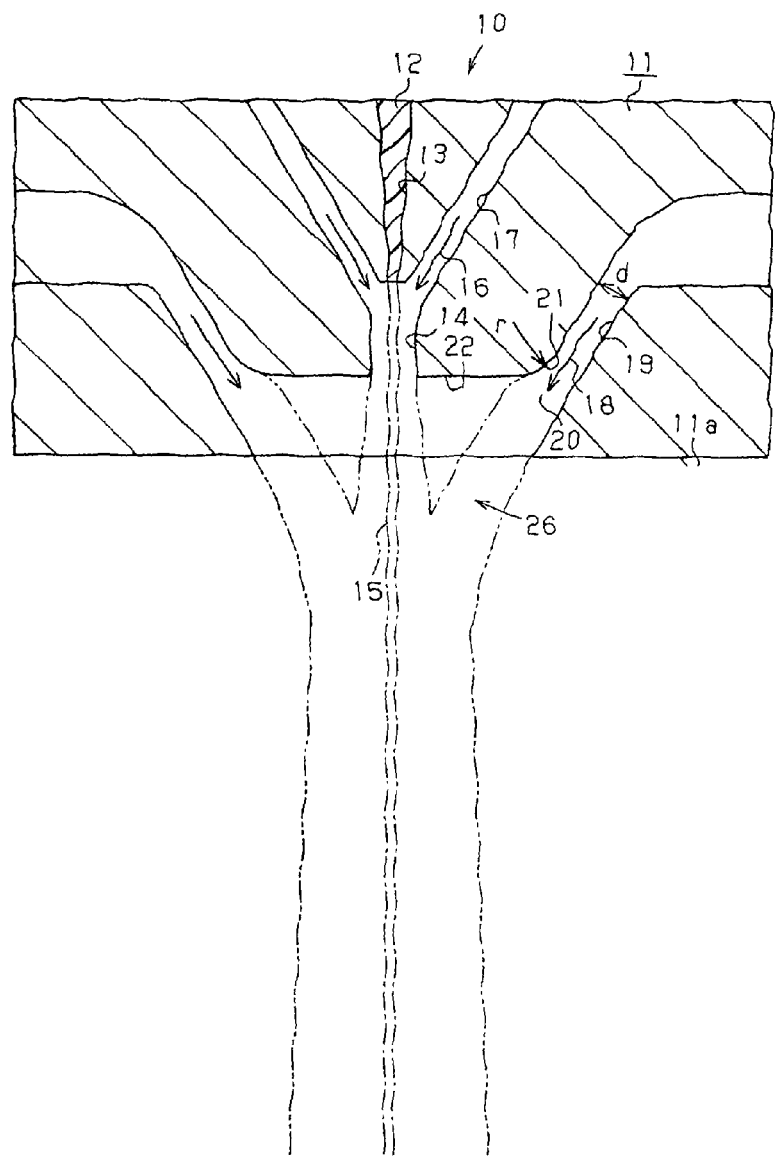
FIG. 1 is a cross-sectional view showing a melt spinning apparatus according to a first embodiment of the present invention.

A melt spinning apparatus 10 shown in FIG. 1 is for producing nonwoven fabrics from raw resin. The melt spinning apparatus 10 includes an apparatus body 11 having multiple spinning nozzles 13 extending in the vertical direction. A molten resin 12 is extruded from these nozzles 13 into a state of filament (thread). The spinning nozzles 13 are aligned in a horizontal direction to form a row of openings at fixed intervals. Each spinning nozzle 13 has a tapered shape, with a decreasing inner diameter toward the exit. An extruder (not shown) melts the raw resin as the molten resin 12 and feeds it to the spinning nozzles 13. The molten resin 12 is then extruded from the spinning nozzles 13 to a passage 14 provided in the apparatus body 11 at the lower part thereof, and forms filaments 15.

The apparatus body 11 has primary air channels 17 on both sides of the spinning nozzle 13, with these air channels 17 forming a V-shape in a cross-sectional view. The primary air channels 17 are provided along the row of the spinning nozzles 13. The primary air channels 17 direct hot primary airflow 16 to the filament 15 extruded from the spinning nozzle 13. Each primary air channel 17 has a constant internal diameter from the proximal end to the distal end. The velocity of the primary airflow 16 is greater than the velocity of the filament 15 extruded from the spinning nozzle 13. Thus, the filament 15 is stretched by air-drag forces caused by the primary airflow 16. However, the velocity of the primary airflow 16 is not so large that the filaments 15 vibrate. In addition, the temperature of the primary airflow 16 is not so high that the filaments 15 degrade.

The apparatus body 11 also has secondary air channels 19 at a position downstream of the respective primary air channels 17. The secondary air channels 19 are for directing hot secondary airflow 18 to the emerging filament 15. The secondary air channels 19 are provided along the row of the spinning nozzles 13. As shown in FIGS. 1 and 2, each secondary air channel 19 has a proximal portion extending in the horizontal direction and a distal portion extending at an angle relative to the proximal portion. A part, which is closer to the spinning nozzle 13, of the wall of each secondary air channel 19 defining an air exit 20 of the secondary air channel 19, is chamfered in an arcuate shape in cross-section to provide a chamfered portion 21. The chamfered portion 21 allows the secondary airflow 18 to smoothly leave the secondary air channel 19 through the air exit 20 without any turbulence being caused, along the arc of the chamfered portion 21 as depicted by the chain double-dashed lines in FIG. 2.

The radius r of the arc of the chamfered portion 21 is preferably 0.2 to 10 times as large as the inner diameter d of the secondary air channel 19. More specifically, the radius is preferably 0.5 to 3 mm. In this case, further improvement is accomplished in straightening the secondary airflow 18 because the secondary airflow 18 is reliably guided along the arc of the chamfered portion 21 when it leaves the secondary air channel 19 through the air exit 20.

Figure 3:
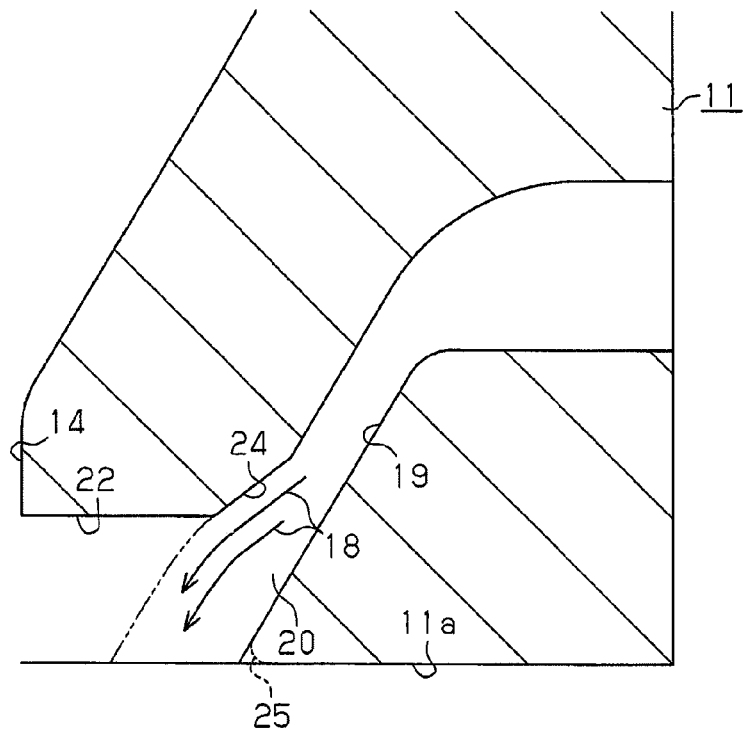
FIG. 3 is an enlarged cross-sectional view showing a part of a melt spinning apparatus according to a modified version wherein a chamfered portion of the melt spinning apparatus in FIG. 1 is modified.

As shown in FIG. 3, the air exit 20 of each secondary air channel 19 may have a chamfered portion 24 with a flat shape in cross-section in place of the chamfered portion 21 with the arcuate shape in cross-section. In this case also, the secondary airflow 18 smoothly leaves the secondary air channel 19 through the air exit 20 without any turbulence being caused, along the chamfered portion 24 as depicted by the chain double-dashed lines in FIG. 3.

As shown in FIG. 1, the direction in which the secondary airflow 18 leaves the secondary air channel 19 through the air exit 20 is in parallel with the direction of the primary airflow 16 flowing within the primary air channel 17. After leaving the secondary air channel 19, the secondary airflow 18 flows downward along the filament 15, surrounding the primary airflow 16 which flows downward along and around the filament 15. As a result, the secondary airflow 18 functions as an air curtain that creates a barrier to separate the primary airflow 16 from outside air. This prevents the temperature of the primary airflow 16 from decreasing under the influence of the outside air. It is preferable that the temperature of the secondary airflow 18 is higher than that of the primary airflow 16 in order to avoid the decrease in temperature of the primary airflow 16 more effectively. In addition, it is preferable that the velocity of the secondary airflow 18 is approximately equal to that of the primary airflow 16 in order to reduce any turbulence of the secondary airflow 18.

Because the secondary airflow 18 functions as the air curtain and thus the decrease in temperature of the primary airflow 16 does not occur, the filament 15 is stretched by the primary airflow 16 while keeping its high temperature. The sufficiently stretched filament 15 exhibits a higher strength of the filament 15, with orientation of filament molecules formed in one direction. It is preferable that the velocity of the secondary airflow 18 is lower than that of the primary airflow 16 in order to make the secondary airflow 18 function satisfactorily as the air curtain. For the same reason, it is preferable that the flow rate of the secondary airflow 18 is lower than that of the primary airflow 16.

The apparatus body 11 has a recessed surface 22, in parallel with the bottom surface 11a of the apparatus body 11, at an inner position recessed from the bottom surface 11a, above an air convergence 26, where the secondary airflow 18 on right side of the filament 15 and the secondary airflow 18 on left side of the filament 15 meet. This allows the secondary airflow 18 leaving the secondary air channel 19 through the air exit 20 to flow more easily along the filament 15, thereby stretching the filament 15 into a thinner one.

A belt conveyor machine (not shown) is provided below the melt spinning apparatus 10. The belt conveyor machine includes a pair of front and rear rollers, and a belt fitted with the rollers which rotates about them. The filaments 15 extruded from the spinning nozzles 13 are stretched by the primary airflow 16 as described above, drawn vertically, and laid onto the belt, forming a sheet of a nonwoven fabric.

Advantages of the first embodiment are summarized below.

(1) A part, which is closer to the spinning nozzle 13, of the wall of each secondary air channel 19 defining the air exit 20 of the secondary air channel 19 is chamfered to provide the chamfered portion 21. As a result, the secondary airflow 18 is guided by the chamfered portion 21 and can smoothly leave the secondary air channel 19 through the air exit 20. This reduces the likelihood of turbulence in the secondary airflow 18 which otherwise prevents the filament 15 from being drawn straight down. Accordingly, the filament 15 is sufficiently stretched by the primary airflow 16, thereby allowing the formation of thinner filament 15.

(2) The chamfered portion 21 has the arcuate shape in cross-section, so that the secondary airflow 18 can leave the secondary air channel 19 through the air exit 20 along the arc of the chamfered portion 21 more smoothly.

(3) When the radius r of the arc of the chamfered portion 21 is 0.2 to 10 times as large as the inner diameter of the secondary air channel 19, improvement is accomplished in straightening the secondary airflow 18 by the chamfered portion 21.

(4) When the radius r of the arc of the chamfered portion 21 is 0.5 to 3 mm, improvement is accomplished in straightening the secondary airflow 18 by the chamfered portion 21.

(5) The recessed surface 22 provided at a lower portion of the apparatus body 11 facilitates the secondary airflow 18 leaving the secondary air channel 19 through the air exit 20 to flow along the filament 15. This means that the recessed surface 22 further reduces the likelihood of turbulence in the secondary airflow 18, allowing the formation of much thinner filament 15.

Figure 2:
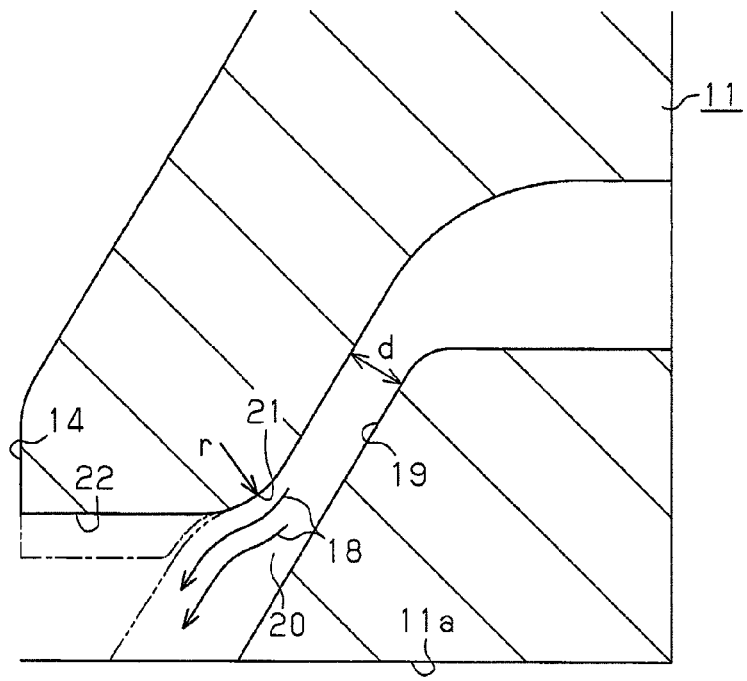
FIG. 2 is an enlarged cross-sectional view showing a part of the melt spinning apparatus in FIG. 1.

(6) When the chamfered portion 24 with the flat shape in cross-section shown in FIG. 3 is provided to the air exit 20 of each secondary air channel 19 in place of the chamfered portion 21 with the arcuate shape in cross-section shown in FIG. 2, similar effects are seen to those obtained with the chamfered portion 21 shown in FIG. 2. In addition, the chamfered portion 24 shown in FIG. 3 can be formed easier than the chamfered portion 21 shown in FIG. 2.

Second Embodiment

Next, a second embodiment of the present invention is described with reference to FIG. 4, mainly in terms of the differences from the first embodiment.

Figure 4:
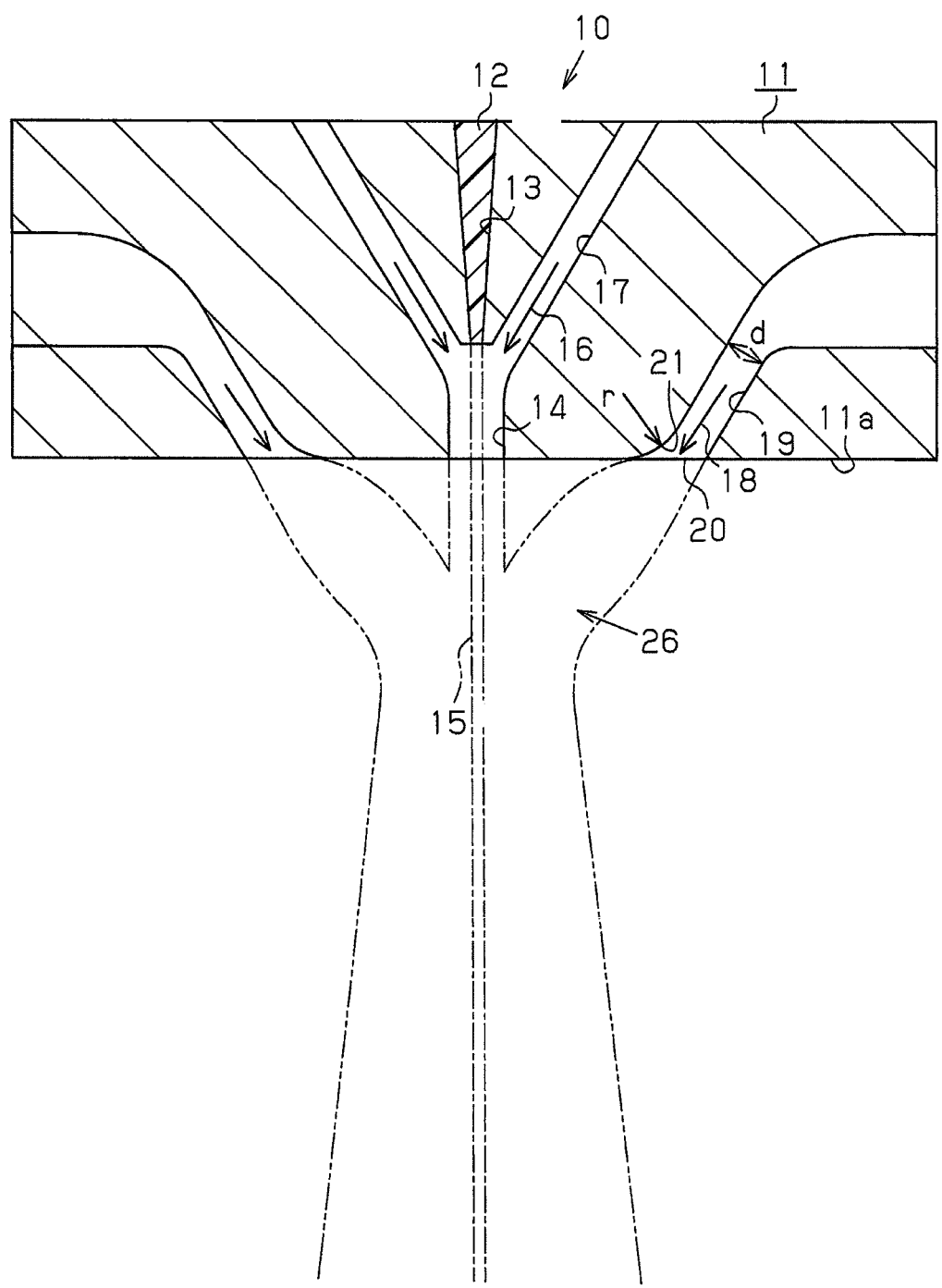
FIG. 4 is a cross-sectional view showing a melt spinning apparatus according to a second embodiment of the present invention.

A melt spinning apparatus 10 shown in FIG. 4 according to the second embodiment does not have the recessed surface 22 that the melt spinning apparatus 10 shown in FIG. 1 according to the first embodiment has. Thus, the chamfered portion 21 with the arcuate shape in cross-section provided at the air exit 20 of each secondary air channel 19 faces directly to the underneath of the apparatus body 11.

In the melt spinning apparatus 10 in FIG. 4, the secondary airflow 18 leaving the secondary air channel 19 through the air exit 20 flows to the underneath of the apparatus body 11 while being guided by the arc of the chamfered portion 21 as depicted by the chain double-dashed lines in FIG. 4. Accordingly, the melt spinning apparatus 10 shown in FIG. 4 can provide advantages similar to those described in (1) to (4) for the first embodiment.

MODIFICATIONS

Each embodiment may be modified as follows.

As depicted by the broken line in FIG. 3, a part of the wall of the secondary air channel 19 defining an air exit 20 of the secondary air channel 19 that is away from the spinning nozzle 13, in other words, a part that is closer to the bottom surface 11a, may be chamfered in an arcuate shape in cross-section to provide a chamfered portion 25. This modification can reduce the eddy turbulence in the secondary airflow 18 which flows out of the air exit 20 of the secondary air channels 19.

In the first and second embodiments, the chamfered portion 21 may have a curved cross-sectional shape other than the arcuate shape, for example, an elliptical arc or a parabolic shape. Alternatively, as depicted by the chain single-dashed line in FIG. 2, it may be formed to have an S shape in cross-section.

The primary air channels 17 and the secondary air channels 19 may annularly surround the respective spinning nozzles 13.

The temperature of the primary airflow 16 may be the same as that of the secondary airflow 18. Alternatively, the flow rate of the secondary airflow 18 may be larger than that of the primary airflow 16.

The taper angle of the spinning nozzle 13 may be varied appropriately. Alternatively, the spinning nozzle 13 may have a hollow cylindrical shape with a constant inner diameter from the proximal end to the distal end, rather than the tapered shape.

The invention claimed is:

1. A melt spinning apparatus comprising an apparatus body, wherein the apparatus body includes:
   a spinning nozzle through which a molten resin is extruded into a filament;
   a primary air channel for directing primary airflow to the filament of the molten resin extruded from the spinning nozzle; and
   a secondary air channel for directing secondary airflow to the filament at a position downstream of the primary air channel, wherein
   an air exit of the secondary air channel includes a chamfered portion configured to straighten the secondary airflow exiting the secondary air channel, and
   the chamfered portion has an arcuate shape in cross-section and is provided on a wall of the secondary air channel closest to the spinning nozzle.

2. The melt spinning apparatus according to claim 1, wherein a radius of the arcuate shape of the chamfered part is 0.2 to 10 times as large as an inner diameter of the secondary air channel.

3. The melt spinning apparatus according to claim 1, wherein the secondary air channel has a proximal portion extending in a horizontal direction and a distal portion extending at an angle relative to the proximal portion.

4. The melt spinning apparatus according to claim 1, wherein
   the apparatus body has a recessed surface at an inner position recessed from the bottom surface of the apparatus body, above an air convergence where the secondary airflow on right side of the filament and the secondary airflow on left side of the filament meet.

5. A melt spinning method in which the melt spinning apparatus according to claim 1 is used, the method comprising:
   extruding a molten resin into a filament through the spinning nozzle; and
   stretching the filament of the molten resin by using primary airflow and secondary airflow directed from the primary and secondary air channels, respectively, to the filament.

* * * * *